L. REED.

Assignor, by mesne assignments, to L. REED & Co.

Barrel-Hoop.

No. 8,501. Reissued Nov. 19, 1878.

*Witnesses:*

A. S. Fitch.

Henry Leichling

*Inventor:*

Louis Reed

By N. C. Wirth

His Atty.

N. PETERS, PHOTO-LITHOGRAPHER, WASHINGTON, D. C.

UNITED STATES PATENT OFFICE.

LOUIS REED, OF NEW YORK, N. Y., ASSIGNOR, BY MESNE ASSIGNMENTS, TO LOUIS REED & CO.

IMPROVEMENT IN BARREL-HOOPS.

Specification forming part of Letters Patent No. 147,284, dated February 10, 1874; Reissue No. 7,932, dated October 30, 1877; Reissue No. 8,501, dated November 19, 1878; application filed October 28, 1878.

*To all whom it may concern:*

Be it known that I, LOUIS REED, of the city, county, and State of New York, have invented an Improvement in Barrel-Hoops, of which the following is a specification:

The invention relates to a wooden barrel-hoop which, in the process of manufacture, is formed flaring by an edgewise curvature of the strip of which the hoop is made, thus obviating the beveling of the strip to obtain the flare, and permitting the hoop to be made of equal thickness across from edge to edge.

Figure 1:
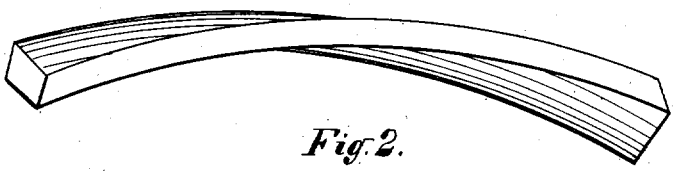
Figure 2:
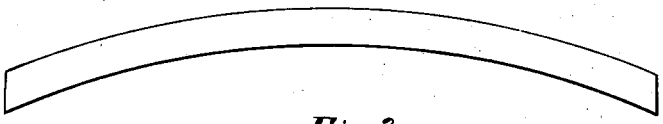
Figure 3:
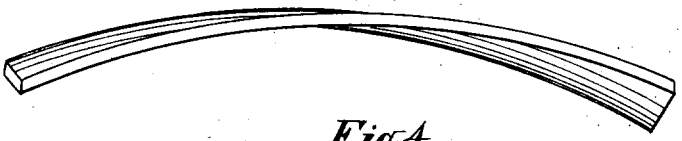
Figure 4:
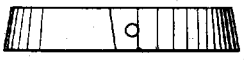
Figure 5:
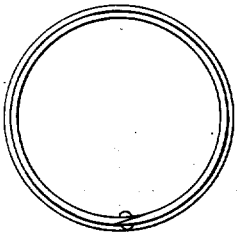

Figure 1 is a perspective view of a curved block of wood designed to be cut or spliced up to make hoops. Fig. 2 is an edge view of the same. Fig. 3 is a perspective view of a slice for a hoop cut from the blocks, Figs. 1 and 2. Fig. 4 is a side view of a hoop formed of the piece, Fig. 3. Fig. 5 is a top view of the same.

The preferable method of making this hoop consists in preparing a block of some kind of proper wood for hoops of suitable length, and as thick as the desired width of the hoops to be made from it, and curving it, as shown in Fig. 1. This permanent curve may be conveniently given to it by first steaming it, and then passing it between rollers, two below and one above, the latter arranged intermediate the former, with their lower peripheral surfaces a little below the plane of the upper peripheral surfaces of the former. This will give to the block a permanent set. It may, however, be bent by any other method most convenient. From the edge of this block I then cut or slice strips or pieces of a suitable thickness for hoops, which are represented by Figs. 3 and 4. When such a strip, one edge of which is longer than the other, is bent flatwise into the form of a hoop, the longer edge will have, of course, a greater diameter than the shorter edge, whereby there may be given to the hoop the requisite flare to fit the taper of a barrel. Any degree of flare may be given to the hoop by the degree of curvature given to the block from which the hoops are cut.

Any other suitable method of curving the strip, whereby a flare is given to the hoop, thereby obviating beveling the strip for the purpose, and admitting of a flaring hoop being made of substantially equal thickness across from edge to edge, may be employed.

I claim—

1. As a new manufacture, a wooden barrel-hoop having a flare by means of an edgewise curvature of the strip or piece of wood of which the hoop is made, substantially as described.

2. The method herein described of fabricating wooden flared barrel-hoops, consisting of giving to the block of wood from which the strips of which the hoops are to be made are cut a permanent curve, and then cutting from the edge of such block strips that may be of substantially-rectangular cross-section, and then bending such strips flatwise to form hoops that are flaring, and yet may be of equal thickness across from edge to edge.

LOUIS REED.

Witnesses:
A. S. FITCH,
M. F. CLIFTON.